Patented June 27, 1950

2,513,180

UNITED STATES PATENT OFFICE 2,513,180

DIRECT PRODUCTION OF AROMATIC VINYL COMPOUNDS AND THERMO-PLASTIC RESINS

Woodrow Ernest Kemp, Montreal, Quebec, Canada, assignor to Dominion Tar & Chemical Company Limited, Montreal, Quebec, Canada, a corporation of Canada No Drawing. Application September 27, 1945, Serial No. 618,982

9 Claims. (Cl. 260—93.5)

This invention relates to the catalytic preparation of vinyl derivatives of nuclear substituted aromatic compounds and their polymers and more particularly to the direct production of the nuclear substituted derivatives of vinyl benzene, vinyl naphthalene, and polymers of same by the direct catalytic addition of acetylene to these aromatic compounds.

The direct addition of acetylene to aromatic compounds such as benzene, toluene, xylene, naphthalene, etc. to give vinyl compounds has long been desired but has never previously been successfully demonstrated as far as applicant is aware. Ellis in "The Chemistry of Synthetic Resins," vol. I (1935 ed.) gives a review of the many previous unsuccessful attempts by numerous workers to prepare styrenes from acetylene using a variety of catalysts. He says in this respect that "no satisfactory process has been evolved as yet using this substance."

The object of the present invention is to provide an economical method for the direct addition of acetylene to toluene, phenol, methyl naphthalene and their nuclear alkyl, alkoxyl and hydroxyl substituted derivatives having at least one nuclear replaceable hydrogen to produce vinyl substituted aromatic compounds and their polymers.

In accordance with the invention these aromatic compounds are reacted in the liquid phase with acetylene in the presence of hydrogen fluoride and a fluoride salt of mercury to give monomeric and/or polymeric vinyl derivatives in good yield. Low temperatures of —20 to —70° C. with hydrogen fluoride concentrations in water of 80 to 100% have been found to give polymers having very desirable properties, while reaction temperatures of —20 to +150° C. with hydrogen fluoride concentrations in water of 10 to 80% are most favourable for the production of more elastic polymers and the preparation of monomeric aromatic vinyl compounds.

Anhydrous mercuric fluoride, its mono and dihydrated salts, mercurous fluoride and mercuric fluorochloride may be used as promoters for the hydrogen fluoride catalyst. Usually however it is most convenient to form the mercury salt in situ, such as by the conversion of the oxide of carbonate to the fluoride when the hydrogen fluoride catalyst is added to the reaction vessel.

This method is inherently flexible in that in addition to producing monomeric aromatic vinyl compounds directly, useful and desirable polymers of these products can also be made in the same operation, thus saving the secondary polymerization step heretofore required.

The proportions of monomer and polymer and degree of polymerization can be varied by adjusting the concentration of hydrogen fluoride and temperature of condensation. The low cost of producing aromatic vinyl compounds and their polymers by the method described is a very valuable feature of this invention.

The following examples in which the proportions are by weight are by way of illustration and not in limitation.

Example 1

A suitable reactor such as a silver clad vessel equipped with a means of internal heating and cooling such as coils or a jacket, fitted with gas entry, exit, and charging and discharging ports and an agitator working through a gas tight bearing is brought to a temperature of +10° C. 4240 parts of meta xylene are charged to the reactor together with 5 parts of mercuric oxide. 420 parts of anhydrous hydrogen fluoride are then added with agitation to convert the mercuric salt to the fluoride. After mixing for 15 minutes at +10° C., 180 parts of distilled water are charged slowly to dilute the hydrogen fluoride concentration in water to about 70%. The temperature of the reaction mixture is then reduced to +5° C. and the air swept out of the reactor by the introduction of pure dry acetylene without agitation. The gas exit port is then closed and the acetylene pressure in the vessel adjusted to about 15 p. s. i. gauge and agitation of the contents of the reactor started. Acetylene is absorbed rapidly with the evolution of heat and the pressure of acetylene and temperature of the reaction are maintained by suitable adjustments. The absorption of acetylene is continued until 181 parts of gas have been introduced. The agitation and introduction of acetylene are then discontinued and the catalyst and promoter discharged into a storage vessel where they are reserved for re-use. The hydrocarbon contents of the vessel are discharged into cold water and washed with further water and alkali until neutral. The neutral product is then fractionated at an absolute pressure of 30 mm. of mercury in the presence of a polymerization inhibitor. In this manner there are recovered 3250 parts of meta xylene and 387 parts of monomeric dimethyl styrene. 403 parts of soluble fusible polydimethyl styrene can be recovered from the still pot. This is a total yield of dimethyl styrene based on acetylene of 86.1% of the theoretical.

Example 2

A suitable reactor such as described in Example 1 is charged with 6000 parts of commercial xylene together with 5 parts of mercuric oxide at 0° C. 500 parts of anhydrous hydrogen fluoride are then introduced with agitation for 15 minutes. The contents of the reactor are then cooled to —40° C. to —50° C. and the air swept out with pure dry acetylene. The gas exit port is then closed, agitation started and at an acetylene pressure of 5 p. s. i. and a temperature of —40° C., 559 parts of acetylene are introduced over a period of about 30 to 60 minutes. Mixing is stopped and the acid catalyst layer discharged to storage. The hydrocarbon layer is dropped into a Monel washing vessel and washed with water and alkali until neutral. The neutral hydrocarbon is charged to a stripping still and the excess xylene removed at an absolute pressure of 30 mm. of mercury to a still pot temperature of about 210° C. to recover 3600 parts of unreacted xylene. The polydimethyl styrene is allowed to cool somewhat under vacuum before removal from the still and is finally removed as a very hard, clear, colourless to pale yellow resin, amounting to 2400 parts. This is a yield of polydimethyl styrene of 84.6% based on acetylene.

*Example 3*

A reactor made of stainless steel and constructed after the fashion of the silver clad kettle described in Example 1 is cooled to 0° C. 460 parts of toluene together with 0.5 part of mercurous carbonate are then charged and while mixing 40 parts of anhydrous hydrogen fluoride are added to convert the mercury salt to the mercurous fluoride. The temperature of the reactor and contents is then reduced to —40° C. and the air swept out as in Example 2. 26 parts of acetylene at 2 p. s. i. are introduced. The acid catalyst and hydrocarbon layers are discharged, and the latter washed as in Example 2. The neutral hydrocarbon is then subjected to distillation as described in the latter example to recover 372 parts of unreacted toluene and 76 parts of slightly plastic, clear, almost colourless polymethyl styrene. This is a 64.2% yield of polymer based on acetylene.

*Example 4*

A silver clad reactor such as that described in Example 1 is charged with 3500 parts of mesitylene together with 7 parts of mercurous fluoride and 400 parts of 75% hydrogen fluoride. The reaction mixture is cooled to —15° C. and after venting the air, agitation is started and acetylene introduced at 25 p. s. i. until 181 parts have been absorbed. The contents of the reaction vessel are then discharged immediately into ice water and the hydrocarbon layer washed free of acid. The neutral hydrocarbon is fractionated in the presence of an inhibitor through a suitable column at an absolute pressure of 30 mm. of mercury. In this fashion 2550 parts of mesitylene are recovered together with 300 parts of vinyl mesitylene. 600 parts of pale, clear, very hard polyvinyl mesitylene can be recovered from the still pot. This is a total yield of vinyl mesitylene based on acetylene of 88.6%.

*Example 5*

A reactor such as described in Example 1 is charged with 5688 parts of a-methyl naphthalene, 5 parts of mercuric fluoride and 300 parts of 70% hydrogen fluoride the temperature of the reaction mixture adjusted to about +40° C. The air is vented from the reactor with acetylene and after starting agitation, acetylene is introduced at 5 p. s. i. until 260 parts of acetylene have been absorbed. The contents of the reaction vessel are discharged and treated as in Example 4 except that the distillation is conducted at 15 mm. of mercury absolute pressure. 4088 parts of unreacted a-methyl naphthalene are recovered together with 300 parts of vinyl methyl naphthalene. 1180 parts of polyvinyl methyl naphthalene are recovered from the still pot. This is a total yield of vinyl naphthalene of 88.0% of theoretical based on acetylene.

It may be seen from the foregoing examples that the operation of this invention to produce vinyl compounds and their polymers by this liquid phase catalytic method is readily accomplished. The metals of converter construction should be those which are not attacked by the catalysts under the conditions employed in the synthesis. When the reaction vessel is acted upon by the catalysts, undesirable side reactions and/or the complete reduction and deactivation of the mercury fluoride promoter may take place. Silver or silver clad steel are most suitable when using dilute hydrogen fluoride.

The preparation of the valuable vinyl derivatives of nuclear substituted aromatic compounds and their polymers in accordance with this invention and as illustrated in the examples proceeds with greater facility than the preparation of vinyl benzene and vinyl naphthalene themselves and shows the wide applicability of the present method of preparing vinyl substituted aromatic compounds.

The preparation of these aromatic vinyl compounds in accordance with this invention may be conducted in the presence of inert liquid diluents such as pentane, hexane or cyclohexane or gaseous diluents such as nitrogen in order to favour monomer formation, or polymers of desired physical properties or degree of polymerization.

While acetylene pressures of about 1–20 lbs. p. s. i. are usually used for these condensations, acetylene pressures in the reaction vessel as high as 100 p. s. i. may be used when higher reaction temperatures are employed.

The addition of acetylene to the aromatic compound is usually conducted in a closed system; however when the acetylene is diluted with an inert gas such as nitrogen, the acetylene is circulated through the system in such a fashion as to continuously replace acetylene consumed in the reaction and maintain the respective concentrations of inert gas and acetylene constant.

The products produced by this method are useful for the preparation of general purpose plastics and also for electrical insulation, wire coating compositions and varnish resins, etc.

I claim:

1. A method of producing vinyl substituted aromatic compounds and their polymers which comprises reacting one of a group consisting of a methyl benzene containing not more than three methyl groups with acetylene in the presence of hydrogen fluoride promoted with a fluoride salt of mercury in the liquid phase at a temperature substantially between —80 and +150° C.

2. A method as defined in claim 1 wherein the reaction is conducted in an inert solvent.

3. A method as defined in claim 1 wherein the acetylene is diluted with an inert gas.

4. A method of producing polymers which comprises reacting in the liquid phase a methyl benzene containing not more than three methyl groups with acetylene in the presence of anhydrous hydrogen fluoride promoted with a mercury fluoride to produce essentially a polymer of the vinyl substituted product.

5. A method which comprises reacting in the liquid phase a methyl benzene containing not more than three methyl groups with acetylene in the presence of aqueous hydrogen fluoride promoted with a mercury fluoride to produce essentially a monomeric vinyl substituted product.

6. A method which comprises adding a mercury salt to a methyl benzene containing not more than three methyl groups in the liquid phase, agitating the mixture with hydrogen fluoride and passing acetylene into the mixture to react with the aromatic compound to produce a mixture of a vinyl derivative of the nuclear substituted aromatic compound and a polymer thereof.

7. In a method of reacting a methyl benzene containing not more than three methyl groups with acetylene, the improvement which comprises employing an anhydrous hydrogen fluoride catalyst containing a fluoride salt of mercury at a temperature of substantially minus 40 to minus 50° C.

8. In a method of reacting a methyl benzene containing not more than three methyl groups with acetylene, the improvement comprising employing a hydrogen fluoride catalyst in aqueous concentrations of 80 to 100%, and containing a fluoride salt of mercury, and carrying out the reaction at minus 20 to minus 70° C.

9. In a method of reacting a methyl benzene containing not more than three methyl groups with acetylene, the improvement comprising employing a hydrogen fluoride catalyst in aqueous concentrations of 10 to 80%, and containing a fluoride salt of mercury, and carrying out the reaction at minus 20 to plus 150° C.

WOODROW ERNEST KEMP.

REFERENCES CITED

The following references are of record in the file of this patent:

UNITED STATES PATENTS

| Number | Name | Date |
|---|---|---|
| 2,295,608 | Ruthruff | Sept. 15, 1942 |
| 2,376,533 | Egloff | May 22, 1945 |
| 2,376,734 | Thomas | May 22, 1945 |
| 2,402,243 | Egloff | June 18, 1946 |
| 2,403,930 | Kuhn, Jr. | July 16, 1946 |

OTHER REFERENCES

"Alkylation Catalysts": Oil Gas J. 44, No. 18, pages 89–93 (1945).